United States Patent [19]
Farmer et al.

[11] 3,787,613
[45] Jan. 22, 1974

[54] PULSE TRANSMISSION SYSTEM FOR CONVEYING DATA AND CONTROL WORDS BY MEANS OF ALTERNATING POLARITY PULSES AND VIOLATIONS THEREOF

[75] Inventors: Wayne David Farmer, Matawan; Joseph George Kneuer, Fair Haven; William Joseph Lawless, Middletown, all of N.J.

[73] Assignee: Bell Telephone Laboratories, Inc., Murray Hill, N.J.

[22] Filed: June 27, 1972

[21] Appl. No.: 266,685

[52] U.S. Cl. .............. 178/2 R, 179/15 R, 178/26 R
[51] Int. Cl. .............................................. H03r 5/20
[58] Field of Search...... 178/2 R, 23 A, 26 A, 69 G, 178/16, 30, 69 R, ; 340/173.2; 179/15 BS, 15 BY

[56] References Cited

UNITED STATES PATENTS

| | | | |
|---|---|---|---|
| 2,912,684 | 11/1959 | Steele | 178/2 R |
| 3,019,293 | 1/1962 | Schwenzfeger | 178/26 A |
| 3,611,161 | 10/1971 | Claxton | 179/15 BS |

*Primary Examiner*—Thomas A. Robinson
*Attorney, Agent, or Firm*—W. L. Keefauver et al.

[57] ABSTRACT

The data bits of data words are encoded into bipolar pulses, the polarity of each pulse differing from the polarity of the prior pulse. When the data bits of a control word are encoded, there is also generated a bipolar pulse violation, the pulse having the same polarity as the prior pulse. Additional bipolar pulses may be inserted to insure that an odd number of bipolar pulses separate pulse violations, successive violations thereby having opposite polarities. A remote decoder converts the bipolar pulses to data bits and the data bits of each control word are recovered from the decoder when the bipolar pulse violation is received.

4 Claims, 5 Drawing Figures

BIPOLAR DECODER

PULSE TRANSMISSION SYSTEM FOR CONVEYING DATA AND CONTROL WORDS BY MEANS OF ALTERNATING POLARITY PULSES AND VIOLATIONS THEREOF

FIELD OF THE INVENTION

This invention relates to data network signaling systems and, more particularly, to signaling systems which convey data information and network control information.

DESCRIPTION OF THE PRIOR ART

The interchange of information between a central office and a digital data subscriber customarily includes network control information, such as line and operating status, in addition to the digital data. The signaling format for the digital data comprises sequences of binary signal bits forming data words. Control information, on the other hand, may be transmitted by the utilization of out-of-band signaling, such as by the transmission of tone signals. In modern data networks, where digital circuitry is employed and where data messages or control information may be stored for subsequent forwarding, it has been found to be advantageous to provide an in-band signaling format for the control information. This has been provided in several ways. One method involves the reservation of certain ones of the data words for control functions. Another arrangement requires the prior transmission of an identifying word which designates subsequently transmitted words as control words rather than data words. The first method, of course, reduces the number of available data words, while the second method requires increased transmission time, especially where data messages are short in relation to the quantity of control information. It is a broad object of this invention to provide a signaling format for baseband data which accommodates in-band control information without requiring the reservation of certain words or the transmission of additional identifying words.

A signaling format useful for transmission over local loops between data subscribers and a control office is baseband bipolar signaling. In bipolar transmission, the baseband data word bits are encoded by three coding rules: a binary 0 is transmitted as zero volts, a binary 1 is transmitted as a positive or negative pulse, and the polarity of each pulse is opposite the polarity of the next preceding pulse. The pulse train has the inherent advantage of being relatively insensitive to low frequency cutoff and free of dc drift. It is another object of this invention to transmit data and control words using a baseband bipolar signaling format.

SUMMARY OF THE INVENTION

In accordance with this invention, control words comprising bit sequences which define network control information are distinguished from data words by utilizing additional information capacity of bipolar signaling known as bipolar violations. A bipolar violation occurs when the alternate polarity rule is violated and a pulse is developed having the same polarity as the prior pulse. Certain ones of the bits of each control word define the network control function and are converted to bipolar pulses. Another one of the bits, however, is converted to a bipolar violation pulse, thereby identifying the bit sequence as a control word.

Since the control codes contain bipolar pulse violations, another coding rule must be provided so that the number of pulses of one polarity equal the number of opposite polarity to prevent dc buildup. It is a feature of this invention that, when a bipolar pulse violation is to be generated, an additional bipolar pulse is inserted in the control word in the event that an even number of bipolar pulses have been encoded subsequent to the preceding violation pulse. This insures that pulse violations are separated by an odd number of bipolar pulses whereby successive pulse violations are of opposite polarity and dc buildup is avoided.

In accordance with the illustrative embodiment of this invention described hereinafter, permutations of data bits defining data words and control words are applied to the encoder, each control word being further identified by an accompanying signal. The encoder converts the data bits to a bipolar pulse train and control means inserts the bipolar pulse violation in each control word in response to the accompanying signal and inserts the additional bipolar pulse if an even number of bipolar pulses were encoded subsequent to the preceding violation pulse. The composite pulse train is applied by way of a line to a remote decoder which develops data bits from the bipolar pulses applied to the line. The permutation of data bits defining each control word is thereupon recovered from the decoder when the violation pulse is applied to the line.

The foregoing and other objects and features of this invention will be more fully understood from the following description of an illustrative embodiment thereof taken in conjunction with the accompanying drawings.

DETAILED DESCRIPTION

Figure 1:
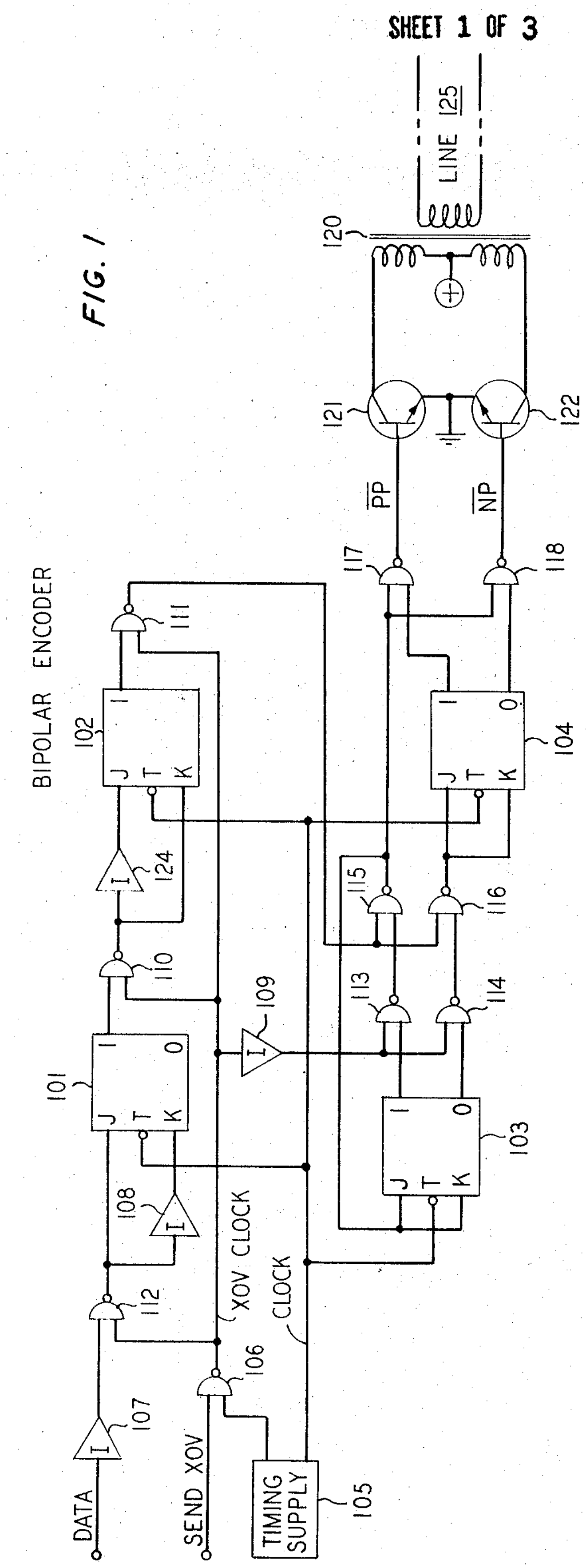
FIG. 1 discloses, in schematic form, the various circuits which form a bipolar encoder in accordance with this invention.
Figure 2:
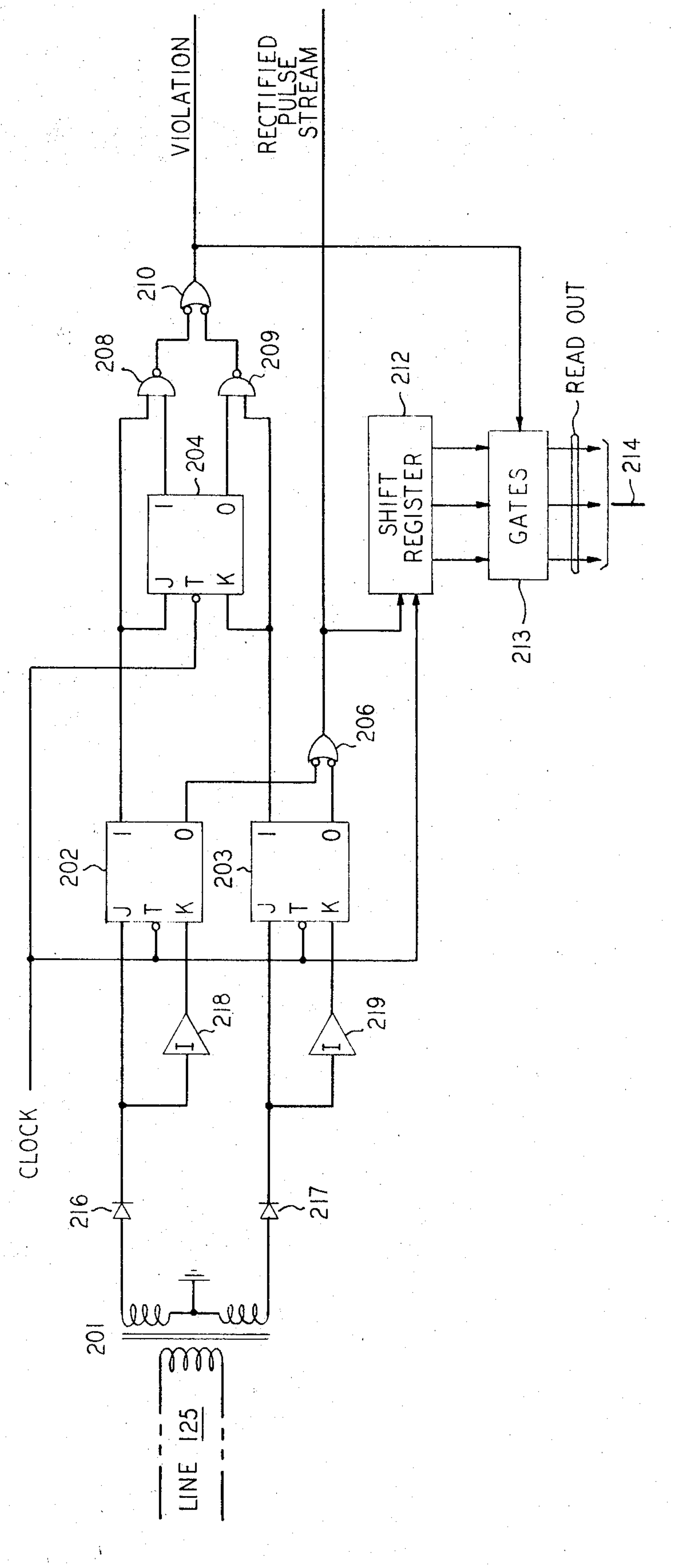
FIG. 2 discloses, in schematic form, the various circuits which form a binary decoder arranged to cooperate with the binary encoder.

The bipolar encoder shown in FIG. 1 provides two general functions; namely, converting incoming data words to bipolar pulse sequences and converting incoming control words to modified bipolar pulse sequences. Both incoming data and control words are received on input lead DATA, the control word being designated by a pulse simultaneously received on lead SEND XOV. After conversion, all pulse sequences are applied to outgoing line 125, which constitutes a balanced pair of metallic leads. Line 125 extends to remote pulse-responsive circuits, portions of which are shown in FIG. 2. Both incoming data and incoming control words constitute sequences of six bits each.

Each data word comprises a six-bit sequence which is converted to a bipolar code sequence wherein each 1 bit in the word is converted to a bipolar pulse, the polarity of the pulse being opposite the polarity of the immediately preceding pulse, and each 0 bit is converted to the absence of a pulse. Each control word comprises a six-bit sequence, the permutation of the first three bits defining each control word, the last three bits being immaterial, and each control word is further identified by an accompanying pulse on lead SEND XOV. Three typical control words are described herein; namely, the words "idle," "test mode" and "out-of-sync." Assuming that the last three bits of each control word sequence are zeros, the "idle" word constitutes the bit sequence 111000, the "test mode" word constitutes the bit sequence 011000, and the "out-of-sync" word constitutes the bit sequence 001000. The bipolar encoder converts each 1 bit in the first three bits of the control word to a bipolar pulse, succeeding 1 bits being converted to pulses of opposite polarity. The fourth bit of the control word (which has been assumed to be a 0 bit) is converted either to no pulse or to a bipolar pulse, the criteria being described hereinafter. The fifth bit, which is assumed to be a 0 bit, provides no output pulse and the sixth bit is always converted to a pulse violation; that is, to a pulse whose polarity is the same as the next preceding pulse in the bipolar pulse sequence. As seen hereinafter, remote pulse-responsive circuits are advised that a control word is being received when the final pulse in the control word bit sequence is a bipolar pulse violation.

The criteria for determining the conversion of the fourth bit in the control word sequence is that there must always be an odd number of bipolar pulses between successive pulse violations, so that successive pulse violations are opposite in polarity to produce a pulse train having no dc component. Thus, if subsequent to the preceding pulse violation, an odd number of bipolar pulses are applied to line 125 up to and including the pulses for the first three bits of the control word, then no output is provided for the fourth pulse. On the other hand, if the number of pulses is even, a bipolar pulse is applied to line 125 for the fourth bit.

Clock signals for the bipolar encoder are supplied by timing supply 105. Timing supply 105 produces a clock signal which defines the bit intervals of the various incoming data and control words. This signal is applied to lead CLOCK and the timing wave thereof is shown as waveform CLOCK in FIGS. 3A, 3B and 3C. Timing supply 105 also provides a pulse designating the sixth bit interval of each word sequence and this pulse is passed to gate 106. The other input to gate 106 comprises lead SEND XOV, which, as previously described, is pulsed when a control word is being sent. The pulse on lead SEND XOV enables gate 106 to pass the sixth bit pulse from timing supply 105 to lead XOV CLOCK. An example of this signal on lead XOV CLOCK is depicted as a similarly identified waveform in FIGS. 3A, 3B and 3C.

Flip-flops 101 and 102 in the bipolar encoder constitute a register for storing the incoming data. As each bit of incoming data is received on lead DATA it is inverted by inverter 107 and applied through normally enabled gate 122. The output of gate 112 is connected to the J terminal input of flip-flop 101 and to the K terminal input of the flip-flop by way of inverter 108. An incoming 1 bit is thus inverted to a negative pulse by inverter 107, driving the output of gate 112 high. An incoming 0 bit drives the output of gate 112 low, driving, in turn, the output of inverter 108 high. The negative transition of the clock pulse, appearing at this time on lead CLOCK, toggles flip-flop 101 to the SET condition in response to an incoming 1 bit and to the CLEAR condition in response to an incoming 0 bit.

The output of flip-flop 101 is passed through normally enabled gate 110 to the K terminal input of flip-flop 102 and to the J terminal input of the flip-flop by way of inverter 124. If flip-flop 101 is storing a "1" bit, the output of gate 110 goes low and the output of inverter 124, in turn, goes high. If flip-flop 101 is storing a 0 bit, the output of gate 110 goes high. A clock pulse now appearing on lead CLOCK, therefore, toggles flip-flop 102 to the SET condition if flip-flop 101 was storing a 1 bit and toggles flip-flop 102 to the CLEAR condition if flip-flop 101 was storing a 0 bit.

The output of flip-flop 102 is passed through normally enabled gate 111 and then, in parallel, through normally enabled gates 115 and 116. The output of gate 115 is connected to the J and K terminal inputs of flip-flop 103 and, in addition, to inputs of gates 117 and 118. The output of gate 116 is connected to the J and K terminal inputs of flip-flop 104.

If a 1 bit is stored in flip-flop 102, the output of gate 111 is low and the outputs of gates 115 and 116 are, in turn, high. The output of gate 115 is passed through one or the other of alternately enabled gates 117 or 118 to output lead $\overline{PP}$ or $\overline{NP}$. Gates 117 and 118 are alternately enabled by the 1 and 0 outputs of flip-flop 104. If we assume that flip-flop 104 is SET, gate 117 is enabled and with a 1 bit in flip-flop 102, lead $\overline{PP}$ goes negative. This turns OFF normally conducting transistor 121, removing current flow from a center tap of transformer 120 to the collector-emitter circuit of the transformer. A positive pulse is therefore applied across the secondary winding to line 125. Conversely, if flip-flop 104 is CLEAR, gate 118 is enabled and normally conducting transistor 122 is momentarily turned OFF. Current flowing in opposition to the above-described current flow through the primary winding of transformer 120 is, therefore, momentarily turned OFF to apply a negative pulse across the secondary winding to line 125. Thus, with gates 111, 115 and 116 enabled and flip-flop 104 SET, a 1 bit in flip-flop 102 produces a negative pulse on lead $\overline{PP}$, resulting in a positive pulse on line 125. Conversely, when flip-flop 104 is CLEAR, a 1 bit in flip-flop 102 produces a negative pulse on lead $\overline{NP}$, resulting in the application of a negative pulse to line 125. It is, of course, evident that if a 0 bit is in flip-flop 102, the outputs of gates 115 and 116 are low and a pulse is therefore not applied to line 125.

Flip-flop 103 maintains a record which indicates whether an odd or even number of bipolar pulses have been applied to line 125 after each pulse violation. If flip-flop 103 is SET, it indicates that an even number of pulses, including no pulses, have been applied to line 125 subsequent to the last pulse violation. Conversely, if flip-flop 103 is CLEAR, it indicates that an odd number of pulses have been applied to line 125. Flip-flop 104 maintains a record of the polarity of each pulse applied to line 125 and determines the polarity of the next subsequent pulse to be applied to line 125.

At the end of each bit interval, a negative transition is applied to lead CLOCK and this clock pulse toggles both flip-flops 103 and 104. If flip-flop 102 is storing a 1 bit (and a bipolar pulse is thus applied to line 125), the outputs of gates 115 and 116 are both high, the potentials on the J and K terminal inputs of flip-flops 103 and 104 are high, and both flip-flops are flipped to their opposite condition. Alternatively, if a 0 bit is stored in flip-flop 102, the outputs of gates 115 and 116 are low, the potentials applied to the J and K terminal inputs of flip-flops 103 and 104 are correspondingly low, and the clock pulse applied to the TOGGLE input of the flip-flops does not flip their conditions. Thus, with a 1 bit in flip-flop 102, a bipolar pulse is applied to line 125, the polarity being determined by flip-flop 104. At the end of the bit interval flip-flops 103 and 104 are toggled to their alternate conditions, flip-flop 103 now indicating a change in pulse count from either even to odd or odd to even and flip-flop 104 determining that the next pulse will be of opposite polarity.

When a control word is transmitted, the first three bits in the sequence are converted to bipolar pulses and applied to line 125 in the conventional manner described above. The last three bits, however, are not converted in the conventional manner and the operations of flip-flops 101, 102, 103 and 104 are modified. This is due to the negative timing supply pulse on lead XOV CLOCK, which pulse occurs during the incoming sixth bit interval and directly after the clock pulse which follows the application of the third bit to line 125.

The negative XOV CLOCK pulse disables gates 110, 111 and 112 and enables gates 113 and 114 by way of inverter 109. The disabling of gate 111 drives its output high to enable gates 115 and 116. As a consequence, the outputs of flip-flop 103 are passed through gates 113 through 116.

If flip-flop 103 is SET, indicating an even number of bipolar pulses have been transmitted since the last pulse violation, the 1 terminal of flip-flop 103 is high, the output of gate 113 is low and the output of gate 115 is therefore high. At the same time, the 0 terminal of flip-flop 103 is low, the output of gate 114 is high and the output of gate 116 is low. Since the output of gate 115 is high, a bipolar pulse is passed through one or the other of gates 117 and 118. Thus, in the event that an even number of bipolar pulses have been transmitted since the last pulse violation, the fourth bit is converted to a bipolar pulse and passed to line 125 but flip-flop 104 is not flipped in anticipation of the generation of the pulse violation. With the high condition at the output of gate 115, the next clock pulse toggles flip-flop 103 back to the CLEAR condition. The clock pulse does not flip flip-flop 104 since the output of gate 116 is low and the flip-flop is thus maintained in the same condition.

If we assume that an odd number of pulses have been applied to line 125 since the last pulse violation, then flip-flop 103 is in the CLEAR condition. In this event, the output of gate 113 is high and the output of gate 115, in turn, is low. No pulse is therefore applied either through gate 117 or gate 118 and the next clock will not flip flip-flop 103. At the same time, the output of gate 114 is low and the output of gate 116, in turn, is high. The next clock pulse therefore does flip flip-flop 104, even though a bipolar pulse is not applied to line 125. The flip-flop is therefore returned to the same condition that it had during the application of the preceding bipolar pulse to line 125. Since, when flip-flop 104 is toggled, it is restored to its former condition, the sixth pulse will constitute a bipolar violation.

The clock pulse that toggles flip-flops 103 and 104 also toggles flip-flops 101 and 102. Since gates 112 and 110 have been disabled by the XOV CLOCK pulse, high conditions are applied to the J terminal input of flip-flop 101 and the K terminal input of flip-flop 102. Thus, instead of passing the sixth bit of the incoming word into flip-flop 101, the flip-flop is toggled to its SET condition, inserting a 1 bit therein. At the same time, instead of passing the fifth bit from flip-flop 101 to flip-flop 102, flip-flop 102 is toggled to the CLEAR condition, inserting a 0 bit therein. Immediately thereafter the XOV CLOCK pulse is removed, states 110, 111 and 112 are re-enabled, gates 113 and 114 are disabled, enabling in turn gates 115 and 116, and the 0 bit in flip-flop 102 is applied to line 125. The fifth bit of the control word is therefore always converted to the absence of a pulse.

The next clock pulse inserts the first bit of the next data word into flip-flop 101 and shifts the 1 bit in flip-flop 101 to flip-flop 102. This applies a bipolar pulse through gates 111 and 115 and the enabled one of gates 117 and 118. Since, as previously described, the condition of flip-flop 104 is the same as it was during the application of the previous bipolar pulse, this pulse applied to line 125 will constitute a bipolar violation. Thereafter, when the next clock pulse is generated, both flip-flops 103 and 104 are toggled, flip-flop 103 always being placed in the SET condition and flip-flop 104 being flipped to its opposite condition in preparation of the application of the next bipolar pulse to line 125.

To more fully understand the operation of the bipolar encoder, sequences of operation that occur when control words are received will be described, starting first with the "out-of-sync" control word.

Figure 3A:
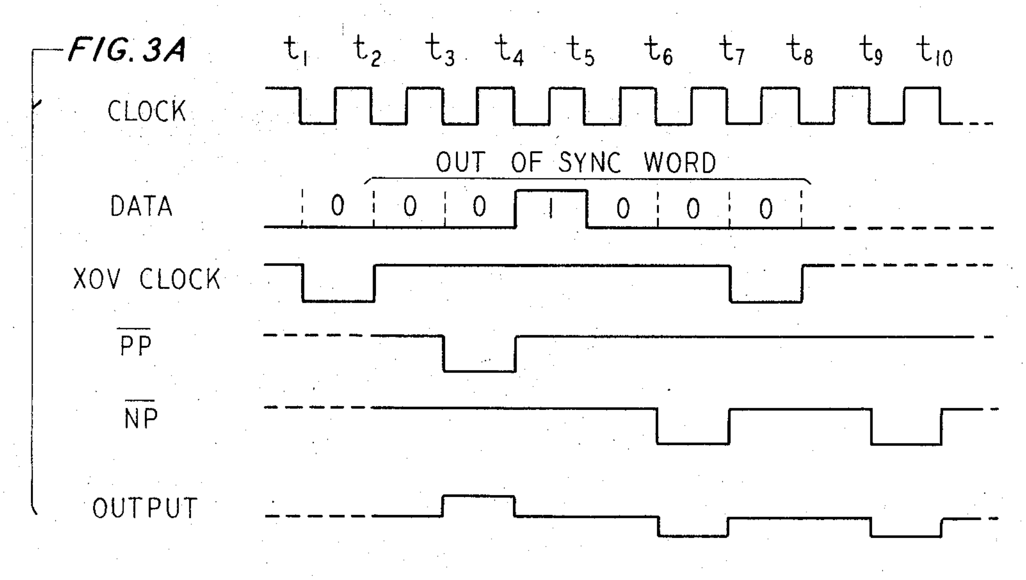
FIGS. 3A, 3B and 3C disclose output waveforms of the several circuits which form the binary encoder when various control words are applied thereto.
Figure 3B:
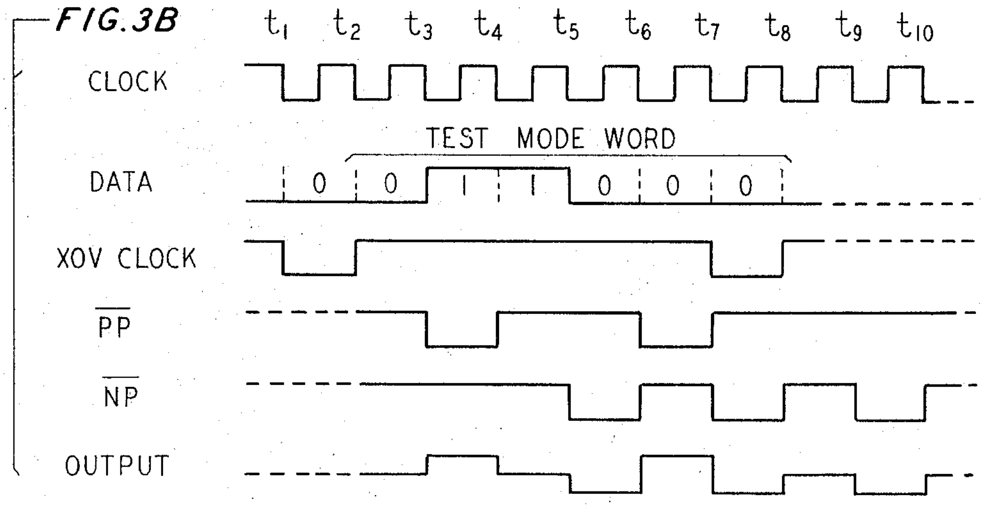

The six-bit sequence of the "out-of-sync" control word is shown as waveform DATA in FIG. 3A. The six bits appear on lead DATA in FIG. 1, between instants $t_2$ to $t_8$ of the clock pulse, as shown in FIG. 3A. It is assumed that directly prior to the reception of the control word an XOV CLOCK pulse was passed through gate 106 during instants $t_1$ to $t_2$ of the clock pulse. Thereafter, during the sixth bit interval of the incoming control word (instants $t_7$ to $t_8$ of the clock pulse), another XOV CLOCK pulse is passed through gate 106, identifying the "out-of-sync" word as a control word.

The negative transition of the clock pulse at instant $t_3$ toggles flip-flop 101. The first bit of the control word is applied through inverter 107 to normally enabled gate 112. Since this bit is a 0 bit, the output of inverter 107 is high and the output of gate 112 is therefore low. As a consequence, inverter 108 is applying a high condition to the K terminal input of flip-flop 101. Flip-flop 101 is therefore toggled to the CLEAR condition and a 0 bit is inserted into the flip-flop.

During instants $t_3$ to $t_4$ the pulse violation for the prior control word is applied to line 125, the polarity of the pulse violation depending on the condition of flip-flop 104, as previously described. It is assumed that flip-flop 104 is in the SET condition, enabling gate 117. Lead $\overline{PP}$ therefore has a negative pulse applied thereto between instants $t_3$ and $t_4$. As a result, transistor 121 turns OFF, terminating the current flow through the primary winding of transformer 120 and the collector-emitter path of the transistor. A positive pulse is thereby applied across line 125 by the secondary winding of transformer 120. The waveform of the negative pulse on lead $\overline{PP}$ between instants $t_3$ and $t_4$ is identified in FIG. 3A as waveform $\overline{PP}$ and the resultant pulse signal across line 125 is identified as waveform OUTPUT.

The negative transition of clock pulse at instant $t_4$ inserts the second bit of control word "out-of-sync" into flip-flop 101 and the first bit into flip-flop 102.

Since flip-flop 101 is storing a 0 bit and is therefore in the CLEAR condition, the output of normally enabled gate 110 is high and this high condition is passed to the K terminal input of flip-flop 102. The clock pulse therefore toggles flip-flop 102 to the CLEAR condition. At the same time, the second bit, which is a 0 bit, is inserted into flip-flop 101, maintaining the flip-flop in the CLEAR condition.

The clock pulse transition at instant $t_4$ also toggles flip-flops 103 and 104, flip-flop 103 being always placed in the SET condition, as previously described, and flip-flop 104 being toggled to the CLEAR condition, since it has been assumed that flip-flop 104 was in the SET condition while the pulse violation was being applied to line 125.

From instant $t_4$ to $t_5$, with flip-flop 104 in the CLEAR condition, gate 118 is enabled and the output of flip-flop 102 is passed through normally enabled gate 111, normally enabled gate 115 and gate 118 to lead $\overline{NP}$. Flip-flop 102 is storing a 0 bit, the output of gate 115 is therefore low, and the output of gate 118 is maintained high. No pulse is applied to line 125 between instants $t_4$ and $t_5$.

At instant $t_5$ the clock shifts the second bit of the control word from flip-flop 101 to flip-flop 102 and inserts the third bit, a 1 bit, into flip-flop 101. The 1 bit on input lead DATA drives the output of inverter 107 low and the output of normally enabled gate 112 is therefore high. The clock pulse therefore toggles flip-flop 101 to the SET condition. From instant $t_5$ to $t_6$, with flip-flop 102 in the CLEAR condition, no pulse is applied to line 125.

At instant $t_6$, the clock pulse transfers the 1 bit in flip-flop 101 to flip-flop 102. More specifically, with flip-flop 101 SET, the output of normally enabled gate 110 is low. This low condition is converted to a high condition by inverter 124 and applied to the J terminal input of flip-flop 102. The clock pulse therefore toggles flip-flop 102 to the SET condition. At the same time, the fourth bit of the control word, which is a 0 bit, is inserted into flip-flop 101, toggling the flip-flop to the CLEAR condition.

In the interval from instant $t_6$ to $t_7$ flip-flop 102 is SET, the output of AND gate 111 is low and the output of AND gate 115 is therefore high. This high condition is passed through AND gate 118, applying a negative pulse to lead $\overline{NP}$, shown as a correspondingly identified waveform in FIG. 3A. Transistor 122 momentarily turns OFF, removing current flow through the primary winding of transformer 120. The winding being in opposition to the currents applied by transistor 121, a negative pulse is applied by the secondary winding of the transformer across line 125. This is shown as a waveform OUTPUT in FIG. 3A.

At instant $t_7$, the clock pulse shifts the fourth bit to flip-flop 102 and inserts the fifth bit into flip-flop 101 although, as previously described, this data will be discarded. At the same time, the clock pulse toggles flip-flops 103 and 104. Since, at instant $t_7$, flip-flop 102 is applying a 1 bit through gate 111, the outputs of normally enabled gates 115 and 116 are both high. These high conditions are applied to the J and K terminal inputs of both flip-flops 103 and 104. Both flip-flops are, therefore, toggled to their opposite condition. In this case, flip-flop 103 is flipped to the CLEAR condition and flip-flop 104 is flipped to the set condition.

In the interval from instant $t_7$ to $t_8$ an XOV CLOCK pulse is passed through gate 106. As previously noted, this negative pulse disables gates 110, 111 and 112 and enables gates 113 and 114 by way of inverter 109. With gate 111 disabled its output is maintained high and this enables gates 115 and 116. Flip-flop 103 is presently in the CLEAR condition. Its output 1 terminal is therefore low, driving the output of gate 113 high and driving, in turn, the output of gate 115 low. This low condition is applied to gates 117 and 118 and no pulse is therefore applied to line 125. The 0 terminal output of flip-flop 103 is high. The output of gate 114 is therefore low and the output of gate 116 is high. This high condition is applied to the J and K terminal inputs of flip-flop 104.

With the XOV CLOCK signal being passed through gate 106, the clock pulse at instant $t_8$ inserts a 1 bit into flip-flop 101 and inserts a 0 bit into flip-flop 102, as previously described. Since the output of gate 116 is high, the clock pulse toggles flip-flop 104 to a condition opposite to its present condition. Its present condition being SET, flip-flop 104 is therefore flipped to the CLEAR condition.

The XOV CLOCK pulse terminates, beginning at instant $t_8$. This re-enables gate 110, 111 and 112 and disables gates 113 and 114. A 0 bit is presently in flip-flop 102 and no pulse is applied to line 125 between instants $t_8$ and $t_9$.

At instant $t_9$ the clock pulse transition shifts the 1 bit in flip-flop 101 to flip-flop 102. It, of course, also inserts the first bit of the next incoming word into flip-flop 101.

From instant $t_9$ to $t_{10}$ the output of flip-flop 102 is passed to line 125. Since flip-flop 102 is storing a 1 bit and flip-flop 104 is in the CLEAR state, a negative pulse is passed to lead $\overline{NP}$, as shown in waveform $\overline{NP}$ in FIG. 3A. A negative pulse is therefore applied across line 125, as shown in waveform OUTPUT. In addition, with flip-flop 102 SET during the $t_9$ to $t_{10}$ instant, the outputs of gates 115 and 116 are high and this condition is applied to the J and K terminal inputs of flip-flops 103 and 104.

At instant $t_{10}$, the negative transition of the clock pulse toggles both flip-flops 103 and 104. Flip-flop 103 is flipped to the SET condition and is prepared to start a new count and flip-flop 104 is also flipped to the SET condition, so that the next bipolar pulse will be positive. The clock pulse, of course, also shifts the first bit of the next word from flip-flop 101 to flip-flop 102 and inserts the second bit into flip-flop 101. Bipolar pulses derived from these bits are thereafter applied across line 125.

Assume now that the "test mode" control word is received, further assume that the immediately preceding word was also a control word, and also assume that flip-flop 104 is in the SET condition. The waveform of control word "test mode" is shown as waveform DATA in FIG. 3B. As previously described, an XOV CLOCK pulse is passed through gate 106 between instants $t_1$ and $t_2$ of the clock pulse and also between instants $t_7$ and $t_8$ of the clock pulse. At instant $t_3$ the first bit of the control word "test mode" is shifted into flip-flop 101. Since flip-flop 104 is SET, a positive pulse violation is applied across line 125 between instants $t_3$ and $t_4$. Thereafter, at instant $t_4$, the first bit of the word is shifted to flip-flop 102 and the second bit, which is a 1 bit, is shifted into flip-flop 101. The clock pulse transition also toggles flip-flop 104 to the CLEAR condition and toggles flip-flop 103 to the SET condition, as previously described.

In the duration of time from instant $t_4$ to instant $t_5$, with flip-flop 102 storing a 0 bit therein, no pulse is applied across line 125. At instant $t_5$ the clock pulse shifts the 1 bit in flip-flop 101 into flip-flop 102 and, in addition, shifts the third bit of the control word, which is a 1 bit, into flip-flop 101.

Between instants $t_5$ and $t_6$ the 1 bit in flip-flop 102 is read out to line 125. Since flip-flop 104 is in the CLEAR condition, a pulse is applied through gate 118 to lead $\overline{NP}$, as shown in waveform $\overline{NP}$ in FIG. 3B. A negative pulse is therefore applied across line 125. At the same time, it is to be noted, flip-flop 102 maintains the outputs of AND gates 115 and 116 high.

At instant $t_6$, the clock pulse toggles both flip-flops 103 and 104 and, since the outputs of gates 115 and 116 are high, flip-flop 103 is flipped to the CLEAR condition and flip-flop 104 is flipped to the SET condition. The clock pulse also shifts the third bit, which is a 1 bit from flip-flop 101 to flip-flop 102 and shifts the fourth bit of the incoming word into flip-flop 101.

From instant $t_6$ to instant $t_7$ the 1 bit in flip-flop 102 is applied to line 125. Since flip-flop 104 is SET, gate 117 is enabled and the pulse is applied to lead $\overline{PP}$, as shown in the correspondingly identified waveform in FIG. 3B. A positive output pulse is therefore applied across line 125, as seen in waveform OUTPUT. At the same time, from instant $t_6$ to instant $t_7$, the outputs of gates 115 and 116 are both high since flip-flop 102 is storing a 1 bit therein.

At instant $t_7$ the clock pulse toggles both flip-flops 103 and 104 and, since the outputs of gates 115 and 116 are high, flip-flop 103 is flipped to the SET condition and flip-flop 104 is flipped to the CLEAR condition. The fourth and fifth bits of the incoming word are shifted to flip-flops 102 and 101, respectively. These bits are discarded, however, as described subsequently.

Between instant $t_7$ and instant $t_8$, gate 106 passes the XOV CLOCK pulse. This disables AND gates 110, 111 and 112 and enables AND gates 113 and 114 by way of inverter 109. AND gate 111, in turn, enables AND gates 115 and 116. Since flip-flop 103 is in the SET condition, the output of gate 113 goes low and the output of gate 115 therefore goes high. With flip-flop 104 in the CLEAR condition, the output of gate 115 is passed through gate 118 and a negative pulse is therefore applied to lead $\overline{NP}$, as seen in the correspondingly identified waveform in FIG. 3B. A negative output pulse is therefore applied across line 125.

At instant $t_8$ the negative transition of the clock pulse toggles flip-flop 103 and the flip-flop is flipped to the CLEAR condition since the output of gate 115 has been high. Since gate 112 has been disabled by the XOV CLOCK pulse, the negative transition of the clock pulse at instant $t_8$ toggles flip-flop 101, inserting a 1 bit therein. With gate 110 disabled, a 0 bit is inserted into flip-flop 102.

After instant $t_8$, the XOV CLOCK pulse is removed and gates 110, 111, 115 and 116 are re-enabled. From instant $t_8$ to instant $t_9$, with a 0 bit in flip-flop 102, no output pulse is applied across line 125.

At clock pulse instant $t_9$ the 1 bit in flip-flop 101 is shifted into flip-flop 102 and the first bit of the next word is shifted into flip-flop 101. From instant $t_9$ to instant $t_{10}$ the 1 bit in flip-flop 102 is applied to line 125. Since flip-flop 104 is in the CLEAR condition, a negative pulse is applied to lead $\overline{NP}$, as shown in the similarly identified waveform in FIG. 3B. A negative pulse constituting a bipolar pulse violation is therefore applied across line 125. It is to be noted at this time that the outputs of gates 115 and 116 are high, since a 1 bit is being stored in flip-flop 102. Therefore, the clock pulse at instant $t_{10}$ toggles flip-flops 103 and 104, flipping both flip-flops to the SET condition.

Figure 3C:
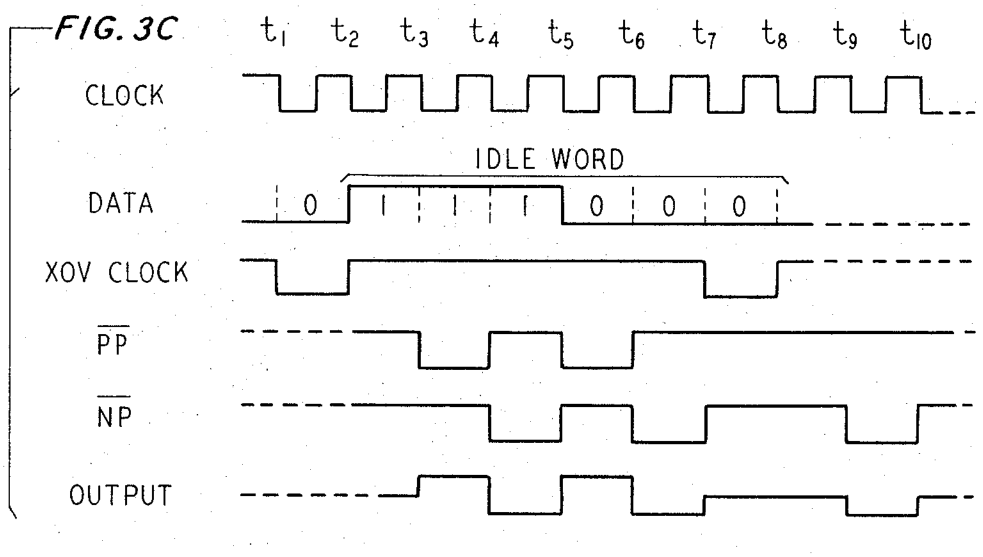

The waveform for the "idle" word is shown as waveform DATA in FIG. 3C. It is assumed that the immediately prior word was a control word and that flip-flop 104 was in the SET condition to provide a positive pulse violation for the prior word. At clock instants $t_3$ and $t_4$ the first two bits of the "idle" control word are shifted into flip-flops 102 and 103. Both flip-flops therefore have 1 bits stored therein. In addition, the clock pulse at instant $t_4$ toggles flip-flop 103 to the SET condition and toggles flip-flop 104 to the CLEAR condition to provide a positive bipolar pulse violation for the preceding control word. Therefore, in the interval from instant $t_4$ to instant $t_5$ the 1 bit in flip-flop 102 is applied to line 125. Since flip-flop 104 is in the CLEAR condition, a negative pulse is applied to lead $\overline{NP}$, as seen in the correspondingly identified waveform of FIG. 3C and a negative bipolar pulse is applied across line 125.

At instant $t_5$, the clock pulse toggles both flip-flops 103 and 104 and, since a 1 bit is stored in flip-flop 102, flip-flop 103 is flipped to the CLEAR condition and flip-flop 104 is flipped to the SET condition. The clock pulse at instant $t_5$ also shifts the second bit of the control word into flip-flop 102 and the third bit into flip-flop 101, both flip-flops thereby having 1 bits stored therein. From instant $t_5$ to instant $t_6$, with flip-flop 104 in the SET condition, the 1 bit in flip-flop 102 is applied through gate 117. A negative pulse is therefore applied to lead $\overline{PP}$, as seen in the correspondingly identified waveform in FIG. 3C. This results in the application of a positive bipolar pulse across line 125.

The clock pulse at instant $t_6$ again toggles both flip-flops 103 and 104, flip-flop 103 being flipped to the SET condition and flip-flop 104 being flipped to the CLEAR condition. The third bit of the control word is inserted into flip-flop 102 by the clock pulse. During the period between instant $t_6$ and instant $t_7$ the 1 bit in flip-flop 102 is passed to line 125. With flip-flop 104 in the CLEAR condition, a negative pulse is applied to lead $\overline{NP}$, as shown in the correspondingly identified waveform in FIG. 3C. A negative bipolar pulse is therefore applied across line 125.

The clock pulse, at instant $t_7$, again toggles flip-flops 103 and 104 and, since a 1 bit is stored in flip-flop 102, flip-flop 103 is flipped to the CLEAR condition and flip-flop 104 is flipped to the SET condition. Thereafter, between instants $t_7$ and $t_8$, the XOV CLOCK pulse is passed through gate 106, disabling gates 110, 111 and 112 and enabling gates 113 and 114. At the same time, gate 111 enables gates 115 and 116. Since flip-flop 103 is in the CLEAR condition, it does not apply an output pulse across line 125. It does, however, drive the output condition of gate 114 low, whereby the output condition of gate 116 is high. The clock pulse at instant $t_8$, therefore, toggles flip-flop 104 to the CLEAR condition.

After instant $t_8$ the XOV CLOCK pulse is removed, disabling gates 113 and 114 and re-enabling gates 110,

111 and 112. At this time a 0 bit is stored in flip-flop 102 and no pulse is therefore applied to line 125 between instants $t_8$ and $t_9$.

The clock pulse at instant $t_9$ now shifts the 1 bit in flip-flop 101 into flip-flop 102. Therefore, between instants $t_9$ and $t_{10}$, the 1 bit in flip-flop 102 is applied to line 125. Since flip-flop 104 is in the CLEAR condition, gate 118 is enabled and a negative pulse is applied to lead $\overline{NP}$, as seen in waveform $\overline{NP}$ in FIG. 3C. A negative bipolar pulse violation is therefore applied across line 125. Thereafter, at instant $t_{10}$, the clock pulse toggles both flip-flops 103 and 104. Flip-flop 103 is thus placed in the initial SET condition to count pulses subsequent to the violation and flip-flop 104 is placed in the SET condition to render positive the next bipolar pulse.

Line 125 terminates at the bipolar decoder shown in FIG. 2. The bipolar decoder generally functions to recover the original data pulse stream and to detect each bipolar pulse violation. Circuitry is also included for recovering the first three bits of each control word sequence.

In the bipolar decoder, flip-flop 202 detects each positive bipolar pulse and flip-flop 203 detects each negative bipolar pulse. The detected pulses are combined in OR gate 206 and the output of the OR gate constitutes a rectified pulse stream corresponding to the stream of pulses on line 125.

Flip-flop 204, together with AND gates 208 and 209, detects bipolar pulse violations. The outputs of gates 208 and 209 are combined by OR gate 210. The output of OR gate 210 thus signals the appearance of a bipolar pulse violation across line 125, indicating that a control word is being received.

Since the output of gate 206 constitutes the rectified pulse stream and the output of gate 210 constitutes each bipolar pulse violation, the original data stream can readily be recovered by inhibiting any word sequence which is identified as a control word by the output of gate 210. The uninhibited word sequences would therefore comprise a pulse stream of data words (without the control words) in the form originally applied to the bipolar encoder.

The rectified pulse output of gate 206 is fed into shift register 212. When the output of gate 210 identifies a bipolar pulse violation, the first three bits of the word shifted into shift register 212 are read out by gates 213 to three parallel readout leads, identified as leads 214. The bits on leads 214 constitute the first three bits of the control word and translation thereof may be provided in any conventional manner.

When a positive bipolar pulse is applied across line 125 it is transformer-coupled through transformer 201 and passed through diode 216 to the J terminal input of flip-flop 202. A clock signal, synchronized with the clock signal derived from timing supply 105 and aligned with the incoming bits, is applied to the TOGGLE input of flip-flop 202. The flip-flop is therefore placed in the SET condition at the end of the bit interval wherein a positive bipolar pulse is received. During the next bit interval, if a negative bipolar pulse or no bipolar pulse is received, the output of diode 216 goes low, inverter 218 converts this low output to a high output, and passes it to the K terminal input of flip-flop 202. The next clock pulse then toggles flip-flop 202 to the CLEAR condition. Flip-flop 202 is therefore placed in the SET condition, for one bit interval, in response to each positive bipolar pulse and is restored to the CLEAR condition unless another positive bipolar pulse is received during the next subsequent bit interval.

When a negative bipolar pulse is received, it is transformer-coupled through transformer 201 and passed through diode 217 to the J terminal input of flip-flop 203. Flip-flop 203 is therefore toggled to the SET condition at the end of the bit interval. During the succeeding bit interval, if a positive bipolar pulse or no pulse is received from line 125, the output of diode 217 goes low. This low condition is converted to a high condition by inverter 219 and applied to the K terminal input of flip-flop 203. The following clock pulse thereupon toggles flip-flop 203 back to the CLEAR condition. Flip-flop 203 therefore is toggled to the SET condition, for one bit interval, in response to the reception of each negative bipolar pulse and is restored to the CLEAR condition unless another negative bipolar pulse is received during the next bit interval.

The 0 terminal outputs of flip-flops 202 and 203 are connected to OR gate 206. If either one or the other of the flip-flops is driven to the SET condition, a 0 bit is provided at its 0 terminal output. This bit is converted to a 1 bit by OR gate 206 and passed therethrough. The output of OR gate 206 therefore constitutes a rectified pulse stream defining the pulses applied across line 125.

The 1 terminal output of flip-flop 202 is connected to the J terminal input of flip-flop 204 and one input of AND gate 208. If a positive bipolar pulse is received, flip-flop 202 is SET, as previously described. This applies a high condition to the J terminal input of flip-flop 204. Flip-flop 204 is therefore toggled to the SET condition by the next clock pulse. The 1 terminal output of flip-flop 204 is connected to gate 208 and gate 208 is enabled with flip-flop 204 in the SET condition.

The 1 terminal output of flip-flop 203 is connected to the K terminal input of flip-flop 204 and one input of AND gate 209. If a negative bipolar pulse is received, flip-flop 203 is SET, as previously described. This applies a high condition to the K terminal input of flip-flop 204 and the flip-flop is toggled to the CLEAR condition by the next clock pulse. The 0 terminal output of flip-flop 204 is connected to gate 209 and the gate is enabled with flip-flop 204 in the CLEAR condition.

If alternate positive and negative bipolar pulses are received over line 125, flip-flop 204 is alternately toggled to its SET and CLEAR conditions. Assume first that a positive bipolar pulse is received. Flip-flop 202 is toggled to its SET condition. The next clock pulse toggles flip-flop 204 to the SET condition, toggles flip-flop 202 to the CLEAR condition, and flip-flop 204, in the SET condition, enables gate 208. When the negative bipolar pulse is received, flip-flop 203 is SET, as previously described. The next clock pulse toggles flip-flop 204 to the CLEAR condition, toggles flip-flop 203 to the CLEAR condition, and flip-flop 204, in the CLEAR condition, enables gate 209 and disables gate 208. Therefore, so long as pulses of opposite polarity are received, gate 208 is always disabled when flip-flop 202 is SET and gate 209 is always disabled when flip-flop 203 is SET.

Assume now that two successive positive bipolar pulses are received. Flip-flop 202 is SET in response to the first bipolar pulse, the next pulse setting, in turn, flip-flop 204 and clearing flip-flop 202. Flip-flop 204 enables gate 208. The next positive bipolar pulse again sets flip-flop 202. This produces a 1 bit at the 1 terminal output of flip-flop 202 and this 1 bit is passed to gate 208 which thereby produces a 0 bit. The 0 bit is applied to OR gate 210, which converts the bit to a 1 bit. The 1 bit output of gate 210 signals that a bipolar pulse violation has been received.

Similarly, two successive negative bipolar pulses enable gate 209 to pass a 0 bit to OR gate 210. Since flip-flop 204 is cleared by the first negative bipolar pulse to enable AND gate 209, when flip-flop 203 is again SET by the second bipolar pulse, the 1 bit output of the 0 terminal output of flip-flop 203 is passed through gate 209. This applies a 0 bit to OR gate 210 and OR gate 210, in turn, passes a 1 bit to its output.

It was previously noted that the rectified pulse stream is also applied to the input of shift register 212. The pulses are shifted into register 212 by the clock pulses. Register 212 thereby stores each word bit sequence having a sufficient number of stages to store the bits of each word. In the event that a control word is received, a 1 bit is produced at the output of OR gate 210. This 1 bit enables gates 213. Gates 213 read out the three stages storing the first three bits of the word. Accordingly, gates 213 are enabled when a control word is received and reads out, to parallel output leads 214, the first three bits of the control word.

Although a specific embodiment of this invention has been shown and described, it will be understood that various modifications may be made without departing from the spirit of this invention.

We claim:

1. A system for transmitting words to a line comprising, a signal source for providing data words, each of the data words being defined by a permutation of a fixed number of binary signal bits, and for providing control words, each of the control words comprising the fixed number of binary signal bits and being defined by a permutation of certain ones of the fixed number of bits, and being further identified by an accompanying signal, encoding means for converting each bit having one of the binary signal conditions to a bipolar pulse having a polarity differing from the polarity of the immediately preceding pulse, control means responsive to the accompanying signal for converting another one of the fixed number of bits of the control word identified thereby to a bipolar violation pulse having the same polarity as the immediately preceding bipolar pulse, and means responsive to the encoding means and to the control means for applying the converted bipolar pulses and violation pulses to the line.

2. A system, in accordance with claim 1, wherein the control means includes means enabled by the application of an even number of bipolar pulses to the line subsequent to the preceding violation pulse for converting an additional one of the fixed number of bits of the control word to a bipolar pulse and for applying said pulse to the line, whereby an odd number of bipolar pulses separate each violation pulse and succeeding violation pulses are of opposite polarity.

3. A system, in accordance with claim 1, wherein there is included bistable means operated in response to the conversion of each of the bits having the one condition for determining the polarity of the next successive pulse and wherein the control means further includes means for operating the bistable means in response to the accompanying signal when an odd number of bipolar pulses are applied to the line subsequent to the preceding violation pulse and means for precluding the operation of the bistable means in response to the conversion of the additional one of the bits of the control word when the even number of bipolar pulses are applied to the line.

4. A system for transmitting words to a line comprising, a signal source for providing data words, each of the data words being defined by a permutation of a fixed number of binary signal bits, and for providing control words, each of the control words comprising the fixed number of binary signal bits and being defined by a permutation of certain ones of the fixed number of bits, and being further identified by an accompanying signal, means for registering the bits provided by the signal source, encoding means for converting each registered bit having one of the binary signal conditions to a bipolar pulse, the encoding means including bistable means for determining the polarity of the bipolar pulse in accordance with the state of the bistable means, means responsive to each of the registered bits having the one condition for operating the bistable means whereby successive bipolar pulses have opposite polarities, and control means responsive to the accompanying signal for precluding the registration of another one of the fixed number of bits of the control word identified thereby and for inserting in the registering means, in place of the other bit, a new bit having the one condition, the control means further including means responsive to the accompanying signal for operating the bistable means, whereby the new bit is converted to a bipolar pulse having the same polarity as the immediately preceding bipolar pulse.

* * * * *